United States Patent
Yamakawa et al.

[11] Patent Number: 6,134,960
[45] Date of Patent: Oct. 24, 2000

[54] THERMAL-TYPE FLOW SENSOR

[75] Inventors: Tomoya Yamakawa; Masahiro Kawai, both of Tokyo, Japan

[73] Assignee: Mitsubishi Denki Kabushiki Kaisha, Tokyo, Japan

[21] Appl. No.: 09/103,939

[22] Filed: Jun. 25, 1998

[30] Foreign Application Priority Data

Jan. 19, 1998 [JP] Japan ................... 10-007692

[51] Int. Cl.[7] .................................................. G01F 1/68
[52] U.S. Cl. ......................................................... 73/204.26
[58] Field of Search ........................... 73/204.26, 204.15, 73/204.22, 204.25, 204.17

[56] References Cited

U.S. PATENT DOCUMENTS

| | | | |
|---|---|---|---|
| 4,688,424 | 8/1987 | Handtmann et al. | 73/204 |
| 4,831,876 | 5/1989 | Porth et al. | 73/204.26 |
| 4,843,881 | 7/1989 | Hubbard | 73/204.16 |
| 5,237,867 | 8/1993 | Cook, Jr. | 73/204.26 |
| 5,410,912 | 5/1995 | Suzuki | 73/204.15 |
| 5,423,210 | 6/1995 | Uchiyama | 73/204.15 |
| 5,703,288 | 12/1997 | Horiguchi et al. | 73/204.26 |
| 5,817,932 | 10/1998 | Nishimura et al. | 73/204.11 |
| 5,852,239 | 12/1998 | Sato et al. | 73/204.26 |
| 5,892,150 | 4/1999 | Isono et al. | 73/204.26 |

FOREIGN PATENT DOCUMENTS 1-185416   7/1989   Japan .

*Primary Examiner*—William Oen
*Attorney, Agent, or Firm*—Sughrue, Mion, Zinn, Macpeak & Seas, PLLC

[57] ABSTRACT

A thermal-type flow sensor capable of generating a monotonously increasing output over a time period of transition from a reverse flow to a forward flow with a simplified structure while exhibiting high sensitivity in the measurement of flow rate in the forward direction. The flow sensor includes a plurality of heat generating portions implemented by upstream heat-sensitive resistor (4) and downstream heat-sensitive resistor (5) within a passage (19) as viewed in a direction in which fluid flows through the passage (19), for thereby measuring a flow rate or a flowing speed of the fluid on the basis of heat transfer phenomenon taking place between the heat generating portions and the fluid. The flow sensor includes a heating current control means (30, 31, 32) for controlling heating currents flowing through the heat-sensitive resistors (4, 5) so that temperatures of the plurality of heat generating portions increase by predetermined values relative to the temperature of the fluid, a means (34) for determining difference between heating currents flowing through the upstream heat generating portion and the downstream heat generating portion, and means (35 to 37) for detecting the flowing speed or the flow rate of the fluid on the basis of the difference between the heating currents.

6 Claims, 10 Drawing Sheets

THERMAL-TYPE FLOW SENSOR

BACKGROUND OF THE INVENTION

1. Field of the Invention

The present invention relates to a thermal-type flow sensor and a flow rate detecting element therefor which includes heat generating members for measuring a flowing speed or a flow rate of a fluid on the basis of heat transfer from heat generating members or parts heated by the heat generating members to the fluid. Such thermal-type flow sensor can find application to measurement of an intake airflow in an internal combustion engine, for example.

2. Description of Related Art

For having better understanding of the invention, background techniques thereof will first be reviewed. FIG. 13 is a view showing a flow rate detecting element employed in a thermal-type flow sensor known heretofore, as disclosed in Japanese Unexamined Patent Application Publication No. 185416/1989 (JP-A-1-185416), and FIG. 14 is a circuit diagram showing a circuit configuration of a thermal-type flow sensor known heretofore. Referring to FIG. 13, the flow rate detecting element employed in the hitherto known or conventional thermal-type flow sensor is constituted by a planar substrate 38 and heat generating resistors 39a and 39b each formed of platinum in a thin film deposited on a surface of the planar substrate 38 through sputtering and photoetching process. The heat generating resistor 39a is destined to be disposed at an upstream position as viewed in the flow direction of a fluid of concern (hereinafter this heat generating resistor 39a will also be referred to also as the upstream heat generating resistor), while the heat generating resistor 39b is disposed at a downstream position as viewed in the flow direction (this heat generating resistor 39b will also be referred to also as the downstream heat generating resistor). The upstream heat generating resistor 39a and the downstream heat generating resistors 39b have respective outer surfaces each coated with a thin film of alumina or silicon oxide. The upstream heat generating resistor 39a and the downstream heat generating resistor 39b are connected to terminals 40a and 40b for external connection, respectively, which are provided on the surface of the planar substrate 38.

Further provided are temperature compensating resistors (not shown) for detecting fluid temperature, each of which is implemented as a heat-sensitive resistor in the form of a platinum thin film through a process similar to that for forming the heat generating resistors mentioned above. The temperature compensating resistor is so designed as to exhibit at least five hundred times as high a resistance value as the heat generating resistor.

Now, referring to FIG. 14, it can be seen that the upstream heat generating resistor 39a, the downstream heat generating resistor 39b and the temperature compensating resistors 41a and 41b are disposed within a main passage 19 through which the fluid flows, the flow rate of which is to be measured. Such fluid may be intake air in an internal combustion engine and hence will be also referred to as the intake air or simply as the air.

The upstream heat generating resistor 39a constitutes a bridge circuit together with the upstream temperature compensating resistor 41a disposed upstream and fixed resistors 42a, 43a and 44a, wherein the potential making appearance at a neutral point between the fixed resistors 42a and 44a and the potential at a neutral point between the fixed resistor 43a and the upstream heat generating resistor 39a are applied, respectively, to the input terminals of a differential amplifier 45a for detecting a potential difference.

A potential difference signal outputted from the differential amplifier 45a is applied to a base of a transistor 46a. In this manner, there is realized a closed lop control for equalizing the potentials at the neutral points mentioned above. Parenthetically, emitter electrode of the transistor 46a is connected to a junction between the upstream temperature compensating resistor 41a and the upstream heat generating resistor 39a while the collector thereof is connected to a power supply.

Similarly, the downstream heat generating resistor 39b constitutes another bridge circuit together with the downstream temperature compensating resistor 41b disposed downstream and fixed resistors 42b, 43b and 44b, wherein the bridge circuit constitutes a closed loop control circuit in cooperation with a differential amplifier 45b and a transistor 46b. More specifically, potential making appearance at a neutral point between the fixed resistors 42b and 44b and potential at a neutral point between the fixed resistor 43b and the downstream heat generating resistor 39b are applied, respectively, to the input terminals of the differential amplifier 45b for detecting a potential difference.

Resistance values of the fixed resistors constituting the bridge circuits are so designed that the temperatures of the heat generating resistors 39a and 39b are higher by ca. 100° C. than the intake air temperature detected by the temperature compensating resistors 41a and 41b, respectively. At this juncture, it should be mentioned that the resistance value RH of the upstream heat generating resistor 39a, for example, can be given by the undermentioned expression on the basis of bridge balancing conditions.

$$RH=\{(Rk+R1) \cdot R3\}/R2$$

where Rk represents a resistance value of the upstream temperature compensating resistor 41a, R1 represents a resistance value of the fixed resistor 42a, R2 represents a resistance value of the fixed resistor 44a, and R3 represents a resistance value of the fixed resistor 43a.

As mentioned previously, the resistance value of the upstream heat generating resistor 39a is so set that the temperature thereof becomes higher by ca. 100° C. than the intake air temperature. Thus, the resistance value of the upstream temperature compensating resistor 41a as well as that of the upstream heat generating resistor 39a remains constant so long as the intake air temperature is constant. The current flowing through the bridge circuit is so controlled through cooperation of the differential amplifier 45a and the transistor 46a that the resistance of the upstream heat generating resistor 39a assumes a constant value independent of the flow rate of the intake air. In this manner, the current flowing through the upstream heat generating resistor 39a can be detected as a voltage drop making appearance across the fixed resistor 43a, whereby the air flow rate can be determined on the basis of the voltage drop mentioned above.

In the conventional thermal-type flow sensor described above, the quantity of heat transferred to the air flow increases as the flow rate thereof increases. On the other hand, because the air flowing along the downstream heat generating resistor 39b has already been heated by the upstream heat generating resistor 39a, the rate of heat transfer to the air flow from the downstream heat generating resistor 39b is low when compared with the heat transfer from the upstream heat generating resistor 39a to the air flow. To say in another way, the upstream heat generating resistor 39a is cooled at higher rate than the downstream heat generating resistor 39b, wherein difference in the rate of cooling between the upstream heat generating resistor 39a and the downstream heat generating resistor 39b increases as a function of the air flow rate.

Consequently, the current required for heating the upstream heat generating resistor 39a in order to maintain constant the resistance value thereof is larger than the current required for heating the downstream heat generating resistor 39b to hold constant the resistance value thereof, wherein the difference in the heating current between the upstream heat generating resistor 39a and the downstream heat generating resistor 39b increases as the flow rate of the air increases. Thus, difference between the inter-terminal voltage Va making appearance across the fixed resistor 43a and the inter-terminal voltage Vb across the fixed resistor 43b bears a functional relation to the air-flow rate or the quantity of air flowing through a passage having a predetermined sectional area, because the heating current is equivalent to the heat transfer rate while the heat transfer rate is given as a function of the air flow rate, as mentioned above.

Thus, the inter-terminal voltage Va becomes higher than the inter-terminal voltage Vb (i.e., Va>Vb) when the air flows in the forward direction (i.e., from the upstream side to the downstream side), whereas the inter-terminal voltage Vb becomes higher than the inter-terminal voltage Va (i.e., Vb>Va) when the air flows in the reverse direction. Accordingly, the difference between the inter-terminal voltages Va and Vb can be utilized as a vector quantity representing both the absolute value of the rate of air flow and the direction thereof. Thus, there can be realized the thermal-type flow sensor which is capable of detecting the direction of the air flow on the basis of difference between the inter-terminal voltages Va and Vb, which difference can be determined by a differential amplifier 47.

In the conventional thermal-type flow sensor described above, the resistors used for constituting the bridge circuits including the upstream heat generating resistor 39a and the downstream heat generating resistor 39b, respectively, are identical in respect to the resistance values. As a consequence, when the difference between the inter-terminal voltages Va and Vb (i.e., Va−Vb) is made use of for deriving the flow rate signal outputted from the thermal-type flow sensor, the difference becomes zero (i.e., Va−Vb=0) when the flow rate is zero while the difference assumes a value of opposite or negative polarity (i.e., Va−Vb<0) when the air flows reversely from the downstream side toward the upstream side.

In case the thermal-type flow sensor of the output characteristics described above is used in association with an apparatus or system to which the output signal of the thermal-type flow sensor is inputted as in the case of a fuel control unit for an internal combustion engine of a motor vehicle, the circuit configuration is so implemented as to be capable of identifying the minus or negative polarity of the input signal in addition to the magnitude thereof, which involves complication of the circuit configuration.

Of course, there may be used a signal resulting from addition of a predetermined bias voltage Vob to the difference between the inter-terminal voltages Va and Vb (i.e., Va−Vb+Vob) internally of the thermal-type flow sensor. However, in that case, a bias voltage adding circuit has to be additionally provided internally of the thermal-type flow sensor. Furthermore, in case the thermal-type flow sensor is destined for use as the intake air fixed resistor sensor in an internal combustion engine system for a motor vehicle, the bias voltage adding circuit mentioned above is required to be so designed that fluctuation of the predetermined bias voltage Vob due to change in the ambient temperature can be suppressed to a possible minimum in view of the fact that the ambient temperature varies over a range of −30° C. to 110° C.

Thus, the measures described above will be accompanied with correspondingly increased expenditure.

On the other hand, when the thermal-type flow sensor is employed in association with the fuel control for an internal combustion engine of a motor vehicle, the flow rate signal may assume a pulsating waveform containing reverse flow rate components in the operating a range in which the throttle valve is opened with such a large opening degree that valve-overlap may take place. In general, however, the flow rate is considerably lower than that in the forward direction. Accordingly, it is preferred to design the thermal-type flow sensor employed in the application mentioned above such that it can exhibit high sensitivity in the forward flow rate measurement.

However, in the conventional thermal-type flow sensor described above, the sensitivity thereof is essentially same for the air flow in both the forward direction and the reverse direction, which means that limitation is imposed on the measurement of the maximum flow rate in the forward direction.

SUMMARY OF THE INVENTION

In the light of the state of the art described above, it is an object of the present invention to provide a thermal-type flow sensor which is capable of generating a monotonously increasing output over a time period from a reverse flow detection to a forward flow detection with a simplified structure, to thereby allow a system for processing or utilizing the output signal of the thermal-type flow sensor to be implemented in a simplified structure.

Another object of the present invention is to provide a thermal-type flow sensor which can exhibit high sensitivity in the measurement of flow rate in the forward direction.

In view of the above and other objects which will become apparent as the description proceeds, there is provided according to a general aspect of the present invention a thermal-type flow sensor including a plurality of heat generating portions implemented by heat-sensitive resistors disposed at positions upstream and downstream within a passage as viewed in a direction in which fluid flows through the passage (hereinafter these resistors will be referred to as the upstream heat-sensitive resistor and the downstream heat-sensitive resistor, respectively), to thereby measure a flow rate or a flowing speed of the fluid on the basis of heat transfer phenomenon taking place between the heat generating portions and the fluid. The thermal-type flow sensor includes a heating current control means for controlling heating currents flowing through the heat-sensitive resistors so that temperatures of the plurality of heat generating portions increase by predetermined values relative to the temperature of the fluid, a means for determining difference between heating currents flowing through the heat generating portion located upstream (hereinafter referred to also as the upstream heat generating portion) and the heat generating portion located downstream (hereinafter referred to also as the downstream heat generating portion), and a means for detecting the flowing speed or the flow rate of the fluid on the basis of the difference between the heating currents. In that case, the heating current flowing through the upstream heat-sensitive resistor is set to be greater than the heating current flowing through the downstream heat-sensitive resistor when the flow rate is zero.

With the arrangement of the thermal-type flow sensor in which difference between the heating currents flowing through the upstream heat-sensitive resistor and the downstream heat-sensitive resistor can be made use of as a flow rate signal, as described above, a monotonously increasing signal of positive polarity (i.e., plus sign) can always be derived as the output signal of the thermal-type flow sensor even when the flow direction of the fluid once changed transiently backwardly resumes the forward direction, which is advantageous in that an interface circuit to be incorporated in a system or apparatus which is designed to process or utilize the output signal of the thermal-type flow sensor can be realized inexpensively in a simplified structure.

In a preferred mode for carrying out the invention, the heat-sensitive resistors constituting the heat generating portions may be so designed that a resistance value of the upstream heat-sensitive resistor is smaller than a resistance value of the downstream heat-sensitive resistor.

By virtue of the above arrangement of the thermal-type flow sensor, the heating current flowing through the upstream heat-sensitive resistor becomes greater than the heating current flowing through the downstream heat-sensitive resistor even when a same amount of Joule heat is generated by the upstream and the downstream heat-sensitive resistors, respectively, wherein difference between the heating currents flowing through the upstream heat-sensitive resistor and the downstream heat-sensitive resistor can be made use of as a flow rate signal, as described above, a monotonously increasing signal of positive polarity (i.e., plus sign) can always be derived as the output signal of the thermal-type flow sensor even when the flow direction of the fluid once changed transiently backwardly resumes the forward direction, which is advantageous in that an interface circuit to be incorporated in a system or apparatus which is designed to process or utilize the output signal of the thermal-type flow sensor can be realized inexpensively in a simplified structure.

In another preferred mode for carrying out the invention, each of the heat-sensitive resistors may be implemented in the form of a film, wherein the upstream heat-sensitive resistor is so designed as to have a film thickness which is greater than that of the downstream heat-sensitive resistor.

Owing to the structure of the thermal-type flow sensor described above, the resistance value of the upstream heat-sensitive resistor can be made smaller than that of the downstream heat-sensitive resistor without degrading degree of freedom in patterning of the upstream heat-sensitive resistor and the downstream heat-sensitive resistor even when these resistors are formed in a same shape and disposed in a same orientation. Thus, essentially same temperature distribution and heat transfer can be realized in both the upstream heat-sensitive resistor and the downstream heat-sensitive resistor, whereby the monotonously increasing output signal can easily be obtained over a transition period from the reverse to forward flow. Additionally, there can be realized the thermal-type flow sensor which ensures enhanced sensitivity.

In yet another preferred mode for carrying out the invention, a mean temperature of the upstream heat-sensitive resistor may be set higher than that of the downstream heat-sensitive resistor.

With the arrangement described above, Joule heat generated by the upstream heat-sensitive resistor becomes higher than that generated by the downstream heat-sensitive resistor even when the upstream and downstream heat generating portions are so implemented that they have a substantially same surface area and that the upstream and downstream heat-sensitive resistors formed therein exhibit a substantially same resistance value. Thus, by making use of the difference between the heating currents flowing through the upstream heat-sensitive resistor and the downstream heat-sensitive resistor, respectively, for generating the flow rate signal, a monotonously increasing output signal of plus sign can easily be obtained constantly over a transition period from the reverse flow to the forward flow, whereby interface to be incorporated in a system designed for processing or utilizing the output of the thermal-type flow sensor can be implemented inexpensively in a simplified structure, to an advantage.

In addition, in the measurement of the flow rate in the forward flow direction, the amount of heat transferred from the upstream heat-sensitive resistor to the downstream heat-sensitive resistor increases, which in turn means that the difference between the heating currents flowing through the upstream and downstream heat-sensitive resistors, respectively, increases correspondingly. Thus, the sensitivity of the thermal-type flow sensor can further be enhanced, to an additional advantage.

In a further preferred mode for carrying out the invention, the upstream heat generating portion may have an area greater than the area of the downstream heat generating portion.

By virtue of the arrangement described above, Joule heat generated by the upstream heat-sensitive resistor becomes higher than that generated by the downstream heat-sensitive resistor. Thus, by making use of the difference between the heating currents flowing through the upstream heat-sensitive resistor and the downstream heat-sensitive resistor, respectively, for generating the flow rate signal, a monotonously increasing output signal of plus sign can easily be obtained over a transition period from the reverse flow to the forward flow, whereby interface to be incorporated in a system designed for processing or utilizing the output of the thermal-type flow sensor can be implemented inexpensively in a simplified structure.

Furthermore, in the measurement of the flow rate in the forward flow direction, the amount of heat transferred from the upstream heat-sensitive resistor to the downstream heat-sensitive resistor increases, which means that the difference between the heating currents flowing through the upstream and downstream heat-sensitive resistors, respectively, increases correspondingly. Thus, the sensitivity of the thermal-type flow sensor can further be enhanced.

According to another aspect of the invention, there is provided a thermal-type flow sensor including a plurality of heat-sensitive resistors disposed at positions upstream and downstream within a passage as viewed in a direction in which fluid flows through the passage, to thereby measure a flow rate or a flowing speed of the fluid on the basis of heat transfer phenomenon taking place between the heat-sensitive resistors and the fluid. The thermal-type flow sensor includes a first resistor connected in series to the upstream heat-sensitive resistor for detecting a heating current flowing through the upstream heat-sensitive resistor, a second resistor connected in series to the downstream heat generating resistor for detecting a heating current flowing through the downstream heat generating resistor, wherein the second resistor has a greater resistance value than that of the first resistor, and a means for detecting a flow rate or a flowing speed of the fluid on the basis of difference between voltages making appearance across the first and second resistors, respectively.

With the structure of the thermal-type flow sensor described above, difference between the heating currents flowing through the upstream heat-sensitive resistor and the downstream heat-sensitive resistor, respectively, can be made use of as a flow rate signal, wherein a monotonously increasing signal of positive polarity (i.e., plus sign) can always be derived as the output signal of the thermal-type flow sensor even when the flow direction of the fluid once changed transiently backwardly resumes the forward direction, which is advantageous in that an interface circuit to be incorporated in a system or apparatus which is designed to process or utilize the output signal of the thermal-type flow sensor can be realized inexpensively in a simplified structure.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1A:
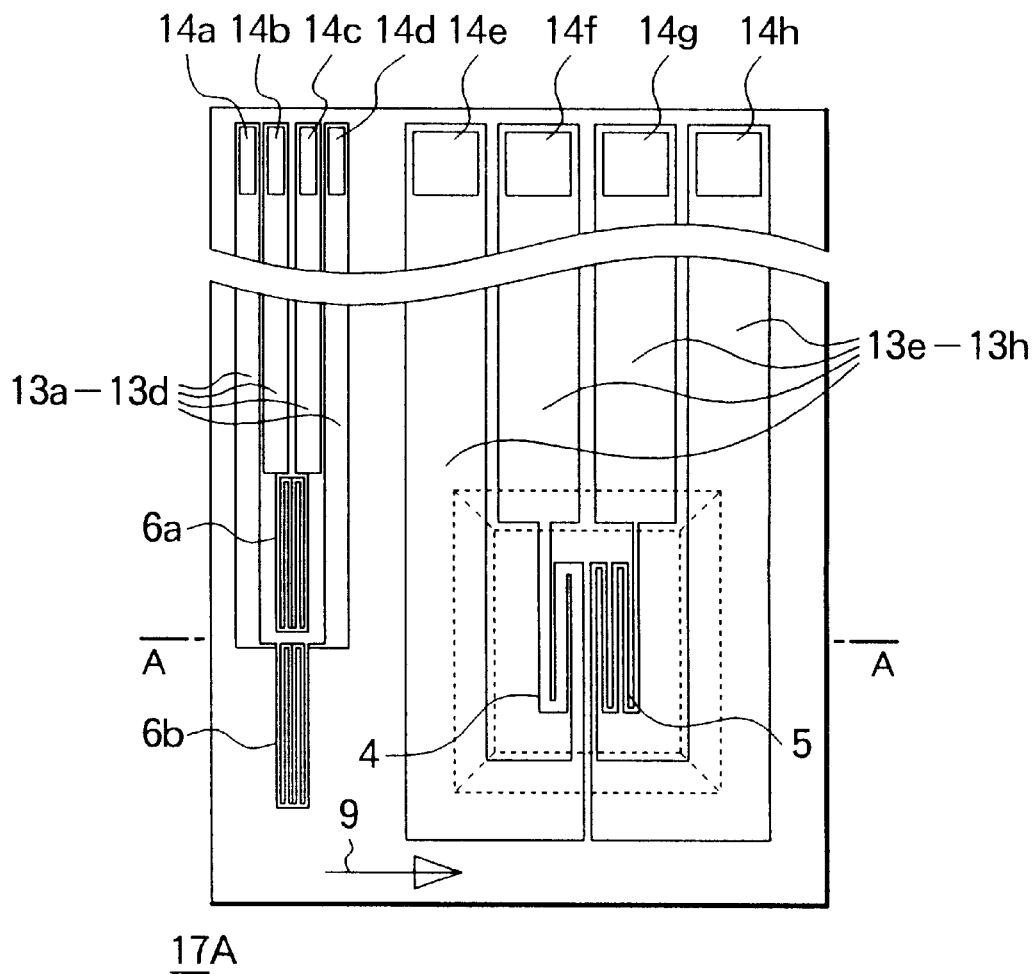
FIG. 1A is a plan view showing a flow rate detecting element according to a first embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "upstream", "downstream", "forward", "backward", "reverse" and the like are words of convenience and are not to be construed as limiting terms.

Embodiment 1

Figure 1B:
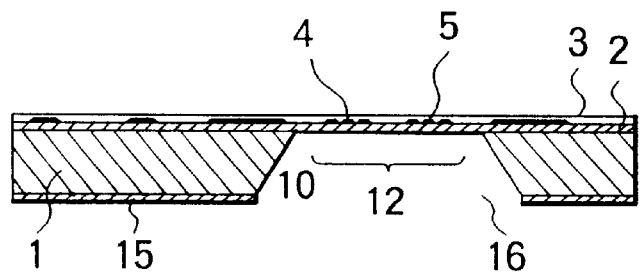
FIG. 1B is a sectional view of the same taken along a line A—A shown in FIG. 1A.

FIG. 1A is a plan view showing a flow rate detecting element 17A according to a first embodiment of the present invention, and FIG. 1B is a sectional view of the same taken along a line A—A shown in FIG. 1A.

The flow rate detecting element 17A according to the instant embodiment of the invention includes a planar (or plate-like) substrate 1 formed of silicon in a thickness of 0.4 mm, a base film 2 of an insulation material such as silicon nitride or the like and deposited over a top surface of the planar substrate 1 in a thickness of 1 $\mu$m through sputtering, vapor deposition, CVD (chemical vapor deposition) or the like process, and heat generating resistors 4 and 5 formed of heat-sensitive material such as platinum and deposited on the base film 2 through vapor deposition, sputtering or the like process in the form of a thin film having a thickness of 0.2 $\mu$m.

The heat generating resistors 4 and 5 can be formed by patterning current paths or conductors by resorting to photoengraving, wet or dry etching or the like technique. Each of the heat generating resistors 4 and 5 formed by the patterning has a heat generating portion of 1 mm×0.05 mm. Similarly, deposited on the insulating base film 2 through evaporation, sputtering or the like process are temperature compensating resistors 6a and 6b in the form of heat-sensitive films formed of platinum or the like in a thickness of 0.2 $\mu$m.

Additionally, a protection film 3 of an insulation material such as silicon nitride or the like is formed over the heat generating resistors 4 and 5 and the temperature compensating resistors 6a and 6b in a thickness of 1 $\mu$m through sputtering, evaporation, CVD or the like process.

An arrow 9 shown in FIG. 1A indicates a direction in which a fluid flows whose flow rate is to be measured. More specifically, when the intake air flow rate in an internal combustion engine is to be measured, the arrow 9 indicates a direction in which the intake air flows to engine cylinders from an inlet port. In this conjunction, it is to be noted that in the case of a four-cylinder internal combustion engine, the intake air flow may assume a pulsating form containing reverse flow components in dependence on valve overlap or opening degree of a throttle valve or other conditions prevailing within the intake pipe.

In the state where the fluid of concern such as the intake air flows in the forward direction (e.g. from the inlet port to the engine cylinder, the upstream heat generating resistor 4 is disposed at a position upstream as viewed in the flow direction of the intake air while the downstream heat generating resistor 5 is disposed at a position downstream, wherein both the heat generating resistors 4 and 5 are juxtaposed in the direction in which the air flows. The heat generating resistors 4 and 5 (hereinafter referred to also as the upstream heat generating resistor 4 and the downstream heat generating resistor 5, respectively) and the temperature compensating resistors 6a and 6b are electrically connected to electrodes 14a to 14h via lead patterns 13a to 13h, respectively, for allowing external electric connection to be made outside of the flow rate detecting element. The protection film 3 is removed at the locations corresponding to the electrodes 14a to 14h, respectively, for allowing the external electric connection by a wire bonding or the like means.

Referring to FIG. 1B, a rear-surface protection film 15 is formed on the other surface of the planar substrate 1 in opposition to the base film 2, and an etched hole 16 is formed in the rear-surface protection film 15 through a photoengraving or the like process. Subsequently, the planar substrate 1 is partially removed through alkali etching or the like process, to thereby form a diaphragm 12 having an area of 1.4 mm×0.4 mm.

The upstream and downstream heat generating portions defined by the upstream heat generating resistor 4 and the downstream heat generating resistor 5, respectively, have a same width in the fluid flow direction and a same length in the direction orthogonal to the flow direction. Thus, both the upstream heat generating resistor 4 and the downstream heat generating resistor 5 have a same heat generating area. However, since the upstream heat generating resistor 4 is so designed as to have a greater pattern width and a shorter pattern length than the downstream heat generating resistor 5, the resistance value RH1 of the upstream heat generating resistor 4 is smaller than the resistance value RH2 of the downstream heat generating resistor 5.

Figure 5:
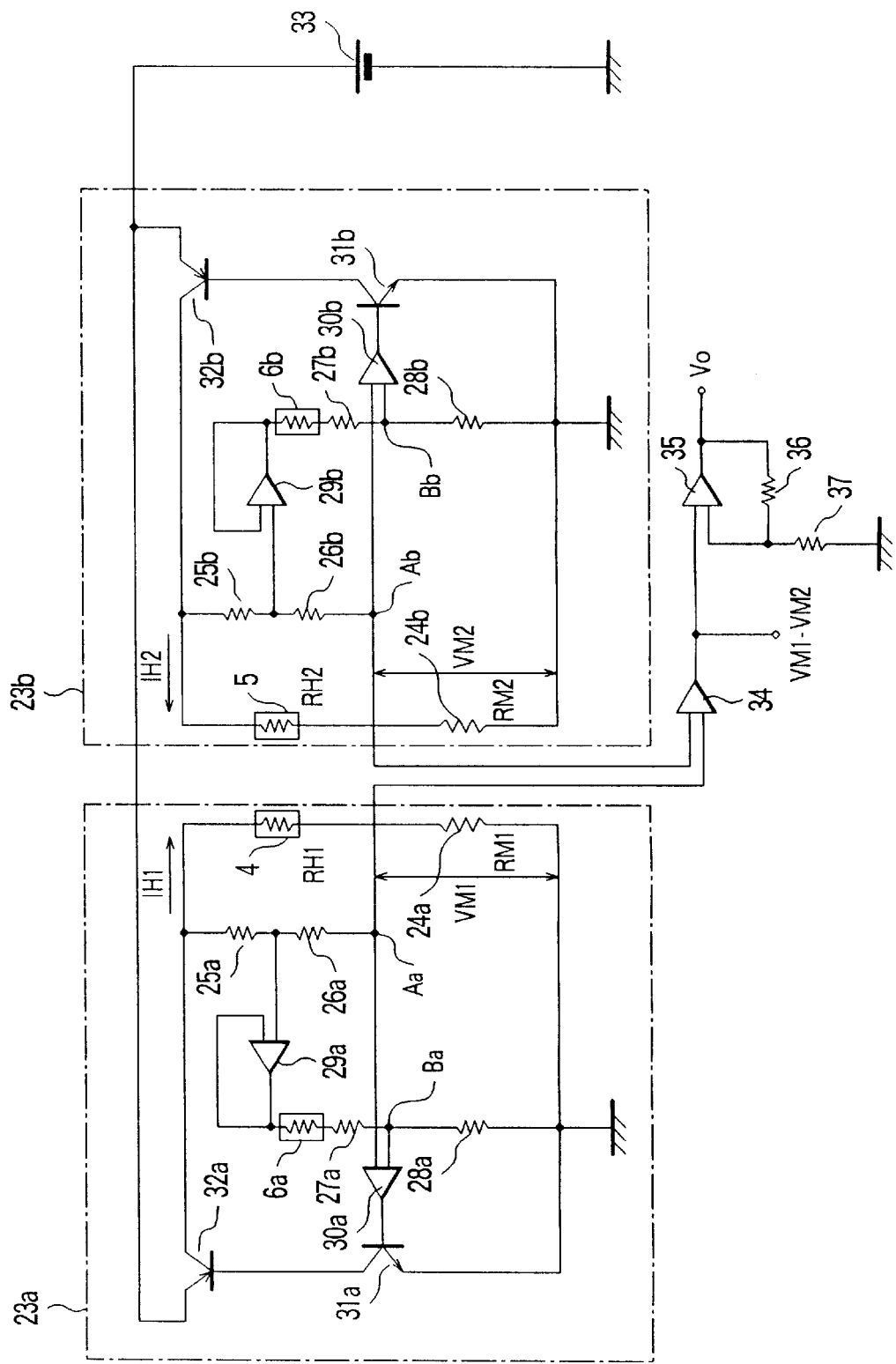
FIG. 5 is a circuit diagram showing a circuit configuration of a thermal-type flow sensor which includes a heating current control circuit and in which flow rate detecting elements according to the embodiments of the invention can selectively be employed.

Parenthetically, it should be mentioned that the flow rate detecting element 17A is not shown on a real scale but shown on an exaggerated scale with a view to facilitating the understanding. Same holds true for other drawings showing flow rate detecting elements according to other embodiments of the invention. FIG. 5 is a circuit diagram showing a circuit configuration of a thermal-type flow sensor including a heating current control circuit and a flow rate/flowing speed detecting circuit according to the instant embodiment of the invention.

A bridge circuit 23a including the upstream heat generating resistor 4 is comprised of a series connection of a temperature compensating resistor 6a and a Wheatstone bridge constituted by the upstream heat generating resistor 4, a reference resistor 24a, a fixed resistor 28a and a fixed resistor 26a, an impedance converter circuit constituted by fixed resistors 25a and 26a and a differential amplifier 29a, a differential amplifier 30a for determining a potential difference between a circuit point Aa and another circuit point Ba (i.e., between the voltages appearing across the reference resistor 24a and the fixed resistor 28a, respectively) and an emitter-grounded npn-type control transistor 31a having a base to which the output of the differential amplifier 30a is applied and a collector connected to the base of a pnp-type output transistor 32a. The impedance converter circuit serves for protecting the temperature compensating resistor 6a from an overcurrent.

The output transistor 32a has an emitter connected to a positive-polarity (+) terminal of a power-supply source 33 while the collector of the output transistor 32a is connected to a positive-polarity terminal of the bridge circuit. Thus, a predetermined collector current of the output transistor 32a which depends on the base current of the output transistor 32a can flow as a heating current through the upstream heat generating resistor 4 by way of the Wheatstone bridge. A closed loop circuit for controlling the heating current IH1 flowing through the upstream heat generating resistor 4 is thus realized through cooperation of the differential amplifier 30a, the control transistor 31a and the output transistor 32a so that the potentials at the circuit points Aa and Ba become equal to each other.

As described hereinbefore in conjunction with the related art, the resistance value RH1 of the upstream heat generating resistor 4 and those of the bridge resistors are so set that the temperature of the upstream heat generating resistor 4 becomes higher by ca. 100° C. than the intake air temperature. The resistance value of the temperature compensating resistor 6a as well as that of the upstream heat generating resistor 4 should remain constant so long as the intake air temperature is constant. The current flowing through the bridge circuit is so controlled through cooperation of the differential amplifier 30a, the control transistor 31a and the control transistor 32a that the resistance value RH1 of the upstream heat generating resistor 4 assumes a constant value independent of the flow rate of the intake air. The current flowing through the upstream heat generating resistor 4 can be detected as a voltage drop making appearance across the reference resistor 24a, whereby the air-flow rate can be determined on the basis of the voltage drop mentioned above.

A bridge circuit 23b including the downstream heat generating resistor 5 is comprised of a series connection of a temperature compensating resistor 6b and a Wheatstone bridge constituted by the downstream heat generating resistor 5, a reference resistor 24b, a fixed resistor 28b and a fixed resistor 26b, an impedance converter circuit constituted by fixed resistors 25b and 26b and a differential amplifier 29b, a differential amplifier 30b for determining a potential difference between circuit points Aa and Ba (i.e., between the voltages appearing across the reference resistor 24b and the fixed resistor 28a, respectively), and an emitter-grounded npn-type control transistor 31b having a base to which the output of the differential amplifier 30b is applied and a collector connected to the base of a pnp-type output transistor 32b.

The impedance converter circuit serves for protecting the temperature compensating resistor 6b from an overcurrent. The output transistor 32b has an emitter connected to a positive-polarity (+) terminal of the power-supply source 33 while the collector of the output transistor 32b is connected to a positive-polarity terminal of the bridge circuit. A closed loop circuit for controlling the heating current IH2 is constituted through cooperation of the differential amplifier 30b, the control transistor 31b and the output transistor 32b so that the potentials at the circuit points Aa and sa become equal to each other.

As described hereinbefore in conjunction with the related art, the resistance value RH2 of the downstream heat generating resistor 5 and those of the bridge resistors are so set that the temperature of the downstream heat generating resistor 5 becomes higher by ca. 100° C. than the intake air temperature. Thus, the resistance value of the temperature compensating resistor 6b as well as that of the downstream heat generating resistor 5 will remain constant so long as the intake air temperature is constant. The current flowing through the bridge circuit is so controlled through cooperation of the differential amplifier 30b, the control transistor 31b and the control transistor 32b that the resistance value RH2 of the downstream heat generating resistor 5 assumes a constant value independent of the flow rate of the intake air. In this manner, the current flowing through the downstream heat generating resistor 5 can be detected as a voltage drop making appearance across the reference resistor 24b, whereby the air-flow rate can be determined on the basis of the voltage drop mentioned above.

Difference between the inter-terminal voltages VM1 and VM2 making appearance across the reference resistors 24a and 24b, respectively, is determined by a differential amplifier 34. In the stage succeeding to the differential amplifier 34, there is connected an amplifier circuit constituted by a differential amplifier 35 and fixed resistors 36 and 37 which serve for determining the amplification factor of the differential amplifier 35. The output Vo of the differential amplifier 35 represents that of the thermal-type flow sensor.

Figure 6:
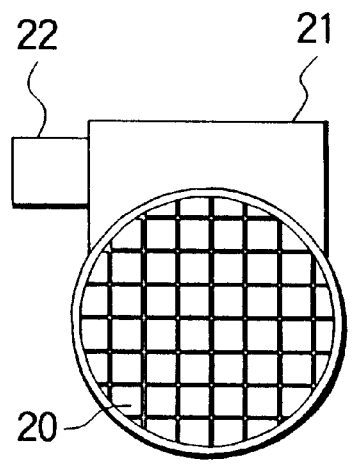
FIG. 6 is a front view showing a thermal-type flow sensor according to an embodiment of the invention.
Figure 7:
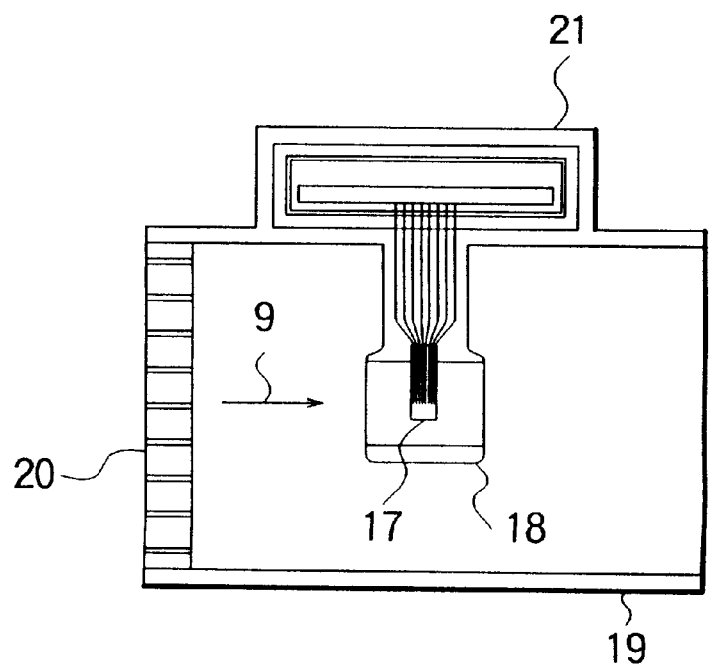
FIG. 7 is a schematic longitudinal sectional view of the same shown in FIG. 6.

FIG. 6 is a front view showing a thermal-type flow sensor employing the flow rate detecting element 17A shown in FIG. 1, and FIG. 7 is a longitudinal sectional view of the same. Referring to FIGS. 6 and 7, the thermal-type flow sensor includes a flow rate detecting element 17, a detecting pipe segment 18 for accommodating therein the flow rate detecting element 17, a main passage 19 for the air flow in which the detecting pipe segment 18 is housed, a lattice-like flow rectifying member 20 which is disposed within the main passage 19 at a location upstream of the flow rate detecting element 17, a casing 21 in which the heating current control circuit and the flow rate/flowing speed detecting circuit shown in FIG. 5 are contained, and a connector 22 employed for supplying electric power to the heating current control circuit and the flow rate/flowing speed detecting circuit as well as for taking out the output signal of the thermal-type flow sensor. Parenthetically, it should be mentioned that the thermal-type flow sensors according to other exemplary embodiments of the invention described hereinafter can be implemented in the structure shown in FIGS. 6 and 7.

In operation, the upstream heat generating resistor 4 and the downstream heat generating resistor 5 are subjected to a feedback control by the control circuit shown in FIG. 5 so that they are at respective predetermined temperatures on an average.

Magnitude of the heating current is then given by a function of a quantity corresponding to a product of the flowing speed and the density of the fluid of which flow rate is to be measured by changing properly the heating current on the basis of the measured fluid temperature detected by the temperature compensating resistors 6a and 6b. The principle underlying the flow rate detection through the constant-temperature-difference control is same as that of the conventional thermal-type flow sensor described hereinbefore.

When the flowing speed of the fluid under measurement increases, the quantity of heat transfer from the upstream heat generating resistor 4 to the fluid increases, which in turn incurs corresponding increase of the heating current flowing through the upstream heat generating resistor 4. By contrast, increasing of the heating current flowing through the downstream heat generating resistor 5 disposed downstream of the upstream heat generating resistor 4 is less than that of the heating current for the upstream heat generating resistor 4, because in the region of the downstream heat generating resistor 5, the fluid flowing therethrough has already been heated by the upstream heat generating resistor 4. Accordingly, by determining the difference between the heating current flowing through the upstream heat generating resistor 4 and the heating current flowing through the downstream heat generating resistor 5 in terms of difference of the voltage drops (VM1−VM2) across the reference resistors 24a and 24b by means of the differential amplifier 34, it is possible to detect the flow rate and the flowing direction of the fluid of concern. Representing Joule heat of the upstream heat generating resistor 4 by H1 while representing that of the downstream heat generating resistor 5 by H2, Joule heat H1 and H2 can be given by the following expressions (1) and (2).

$$H1 = IH1^2 \cdot RH1 = A1 + S1 \cdot h \cdot (TH1 - Ta1) \quad (1)$$

$$H2 = IH2^2 \cdot RH2 = A2 + S2 \cdot h \cdot (TH2 - Ta2) \quad (2)$$

where IH1 represents a heating current flowing though the upstream heat generating resistor 4, IH2 represents a heating current flowing through the downstream heat generating resistor 5, RH1 represents a resistance value of the upstream heat generating resistor 4, RH2 represents a resistance value of the downstream heat generating resistor 5, A1 represents a heat loss when the flow rate at an upstream heat generating portion is zero, A2 represents a heat loss when the flow rate at a downstream heat generating portion is zero, S1 represents an area of the heat generating portion defined in the upstream heat generating resistor 4, S2 represents an area of the heat generating portion defined in the upstream heat generating resistor 5, h represents a heat transfer rate of the heat generating portion, given by
h=f(Q$^n$)
where Q represents a flow rate, and n represents a constant determined by the flow rate, TH1 represents a mean temperature of the upstream heat generating resistor 4, given by TH1=Ta+ΔT1
where Ta represents a temperature of the fluid flowing into the thermal-type flow sensor, and
ΔT represents a temperature rise of the upstream heat generating resistor 4, TH2 represents a mean temperature of the downstream heat generating resistor 5, given by TH2=Ta+ΔT2
where ΔT represents a temperature rise of the downstream heat generating resistor 5, Ta1 represents a temperature of the fluid flowing over and along a surface of the heat generating portion defined in the upstream heat generating resistor 4,
wherein Ta1≈Ta when the fluid is flowing forwardly, and
Ta1>Ta when the fluid is flowing respectively or backwardly, and Ta2 represents a temperature of the fluid flowing over and along a surface of the heat generating portion defined in the downstream heat generating resistor 5,
wherein Ta2>Ta when the fluid is flowing forwardly, and Ta2≈Ta when the fluid is flowing backwardly.

Parenthetically, the heating currents IH1 and IH2are transformed into voltages VM1 and VM2 by the reference resistors 24a and 24b, respectively. Thus, the voltages VM1 and VM2 can be given by the following expressions (3) and (4), respectively.

$$VM1 = IH1 \cdot RM1 \quad (3)$$

$$VM2 = IH2 \cdot RM2 \quad (4)$$

where RM1 represents a resistance value of the reference resistor 24a, and

RM2 represents a resistance value of the reference resistor 24b.

In the case of the thermal-type flow sensor according to the instant embodiment of the invention, RH1<RH2, A1=A2, S1=S2 and TH1=TH2. When the flow rate is zero, Ta1≈Ta2. Thus, H1=H2, which in turn means that VM1−VM2 >0.

Figure 8:
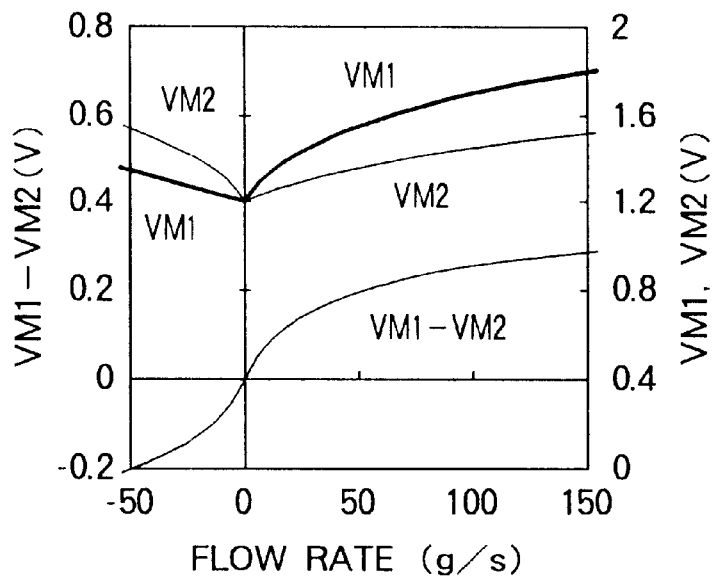
FIG. 8 is a view for graphically illustrating flow rate detection characteristics of a conventional thermal-type flow sensor.
Figure 9:
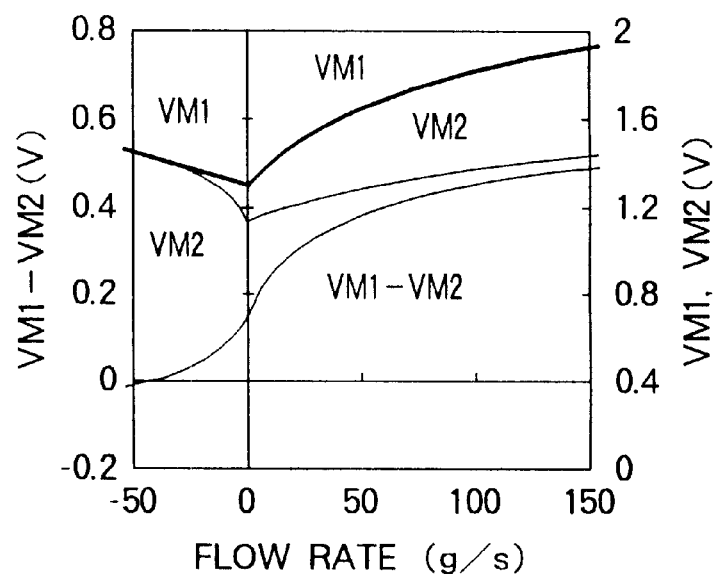
FIG. 9 is a view for graphically illustrating flow rate detection characteristics of a thermal-type flow sensor incorporating the flow rate detecting element according to the first embodiment of the invention.

FIG. 8 is a view for graphically illustrating, by way of example, characteristics behaviors of the inter-terminal voltages VM1 and VM2 as well as that of difference of the voltage drops (VM1−VM2) as a function of flow rates of the air flowing through a pipe having a predetermined diameter in the case where the resistance value RH1 is set equal to the resistance value RH2 similarly to the case of the conventional flow sensor described hereinbefore, and FIG. 9 is a view for graphically illustrating characteristic behaviors of the inter-terminal voltages VM1 and VM2 as well as that of difference of the voltage drops (VM1−VM2) as a function of the flow rate in the thermal-type flow sensor according to the instant embodiment of the invention where the resistance value RH2 is set greater than the resistance value RH1.

As can be seen from these figures, the difference between the inter-terminal voltage VM1 and the inter-terminal voltage VM2 (i.e., VM1−VM2) assumes values of plus sign and increases monotonously within the range of the flow rate exceeding ca. −40 g/s inclusive. Consequently, the system which is designed to receive the output signal of the thermal-type flow sensor according to the instant embodiment for further processing or utilization thereof need not incorporate an interface circuit for processing the input values of minus or negative sign. Besides, there arises no necessity of providing additionally a bias voltage adder circuit internally of the thermal-type flow sensor itself.

The difference of the voltage drops (VM1−MV2) outputted from the differential amplifier 34 is amplified with a predetermined amplification factor by the amplifier circuit (operational amplifier 35 and others) shown in FIG. 5 so that the output Vo of the thermal-type flow sensor assumes a value of zero to 5 volts within a range of flow rates to be measured.

Parenthetically, in the thermal-type flow sensor according to the instant embodiment of the invention, the upstream heat generating resistor 4 is so implemented as to have a grater pattern width and a smaller pattern length than the downstream heat generating resistor 5 in order to realize the condition that RH1<RH2. However, it can readily be appreciated that the above-mentioned condition can be equally realized by enlarging only the pattern width of the upstream heat generating resistor 4 or alternatively only the pattern length thereof.

Embodiment 2

Figure 2A:
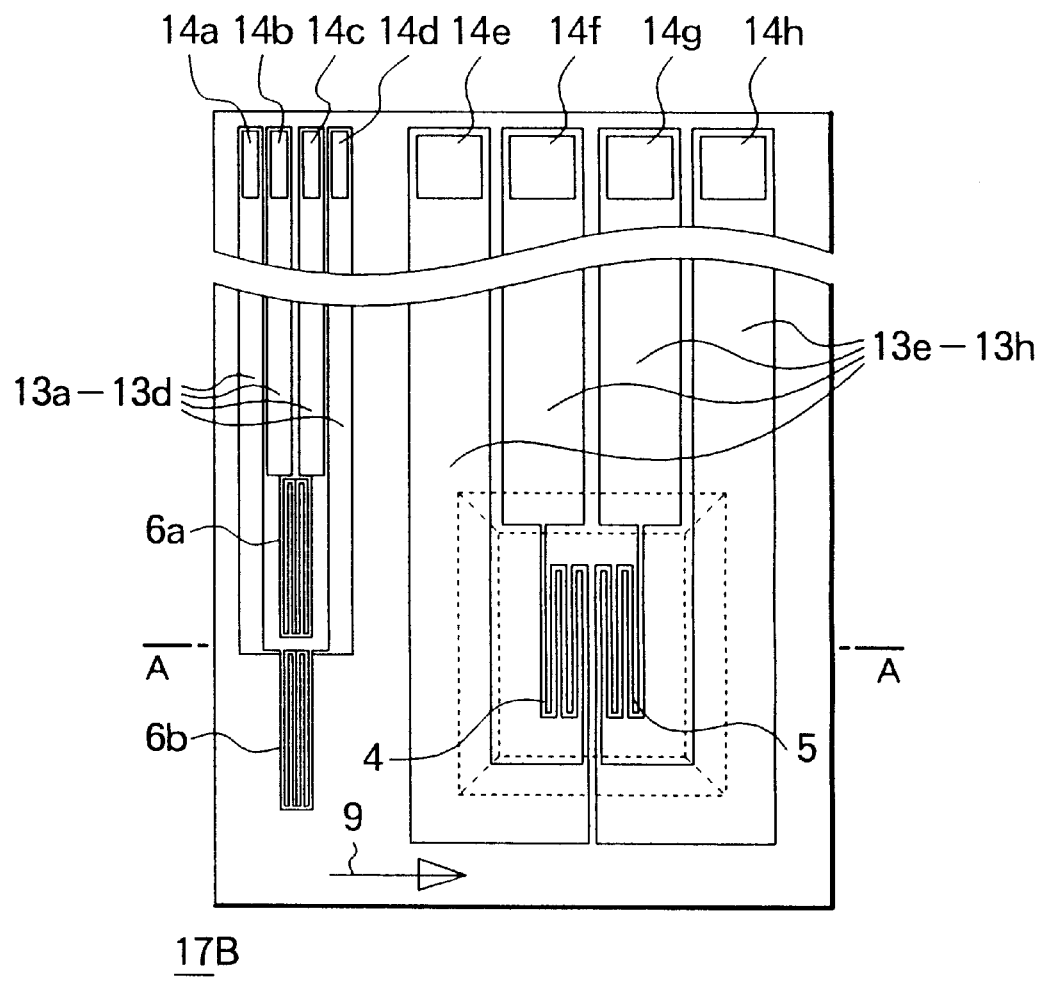
FIG. 2A is a plan view showing a flow rate detecting element according to a second embodiment of the present invention.
Figure 2B:
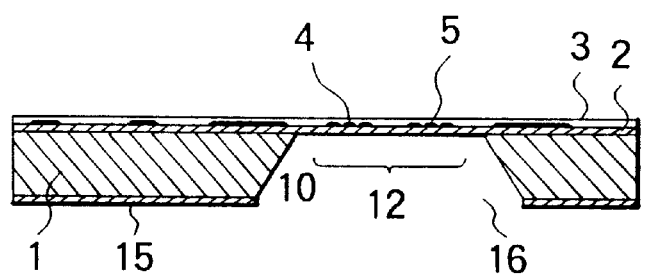
FIG. 2B is a sectional view of the same taken along a line A—A shown in FIG. 2A.

FIG. 2A is a plan view showing a flow rate detecting element 17B according to a second embodiment of the present invention, and FIG. 2B is a sectional view of the same taken along a line A—A shown in FIG. 2A. In the figures, components indicated by reference characters 1 to 16 are like as or equivalent to those employed in the first embodiment of the invention. The patterning for the upstream heat generating resistor 4 is same as that for the downstream heat generating resistor 5 in the thermal-type flow sensor according to the instant embodiment of the invention. However, the thickness of the platinum film is increased at a portion hatched by oblique lines in FIG. 2B. More specifically, the thickness is 0.23 μm.

Operation of the thermal-type flow sensor in which the flow-rate detecting element 17B according to the second embodiment of the invention is employed is essentially same as that of the thermal-type flow sensor described hereinbefore in conjunction with the first embodiment. It should however be mentioned that because the upstream heat generating resistor 4 and the downstream heat generating resistor 5 of the flow-rate detecting element 17B are implemented in identical structure by resorting to the same patterning process, difference in the temperature distribution ascribable to difference in the structure between the upstream heat generating resistor 4 and the downstream heat generating resistor 5 is difficult to take place. Accordingly, the temperature distribution over the heat generating portions can be uniformized, whereby the detection accuracy can be enhanced, to an advantage.

Embodiment 3

Figure 3A:
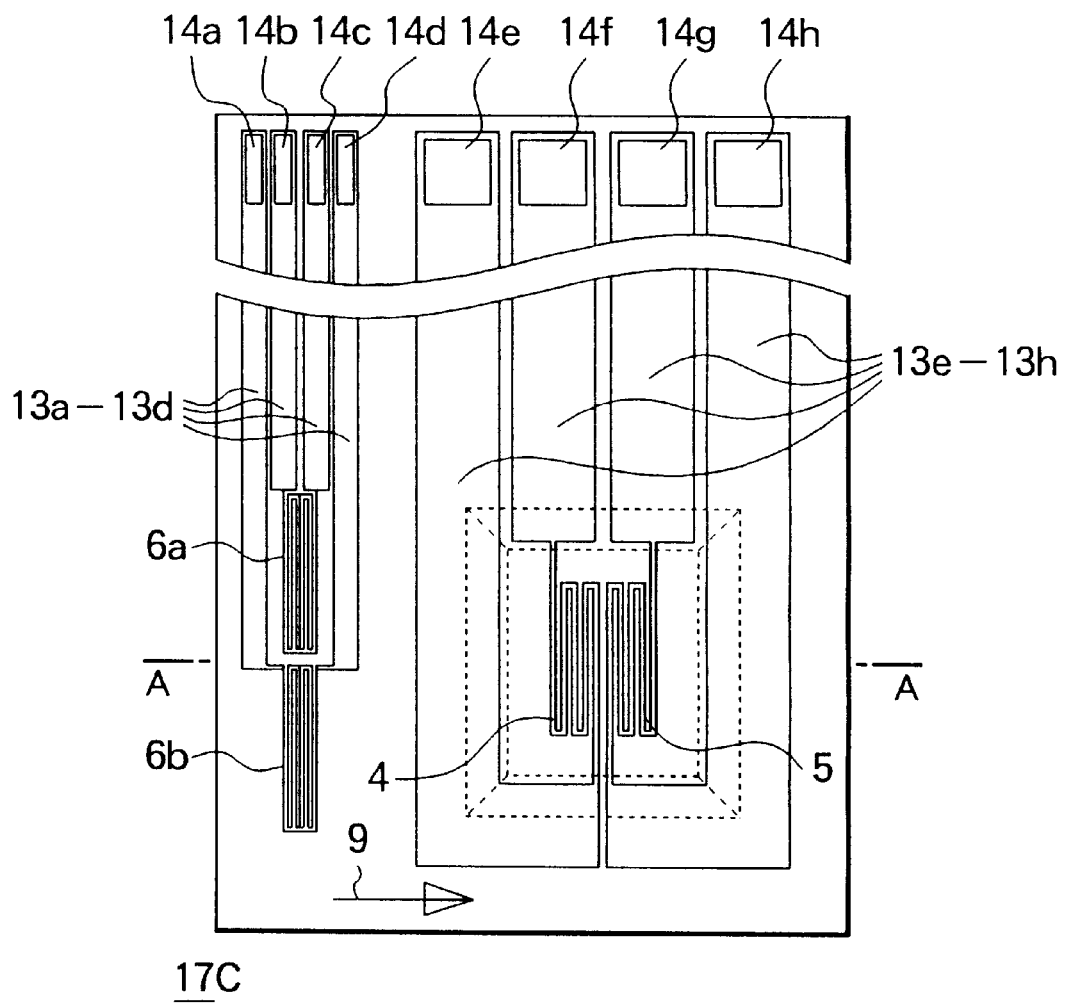
FIG. 3A is a plan view showing a flow rate detecting element according to a third and a fifth embodiments of the present invention.
Figure 3B:
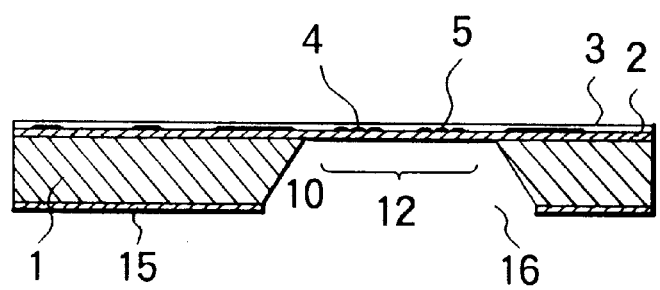
FIG. 3B is a sectional view of the same taken along a line A—A shown in FIG. 3A.

FIG. 3A is a plan view showing a flow rate detecting element 17C according to a third embodiment of the present invention, and FIG. 3B is a sectional view of the same taken along a line A—A shown in FIG. 3A. In the figures, components indicated by reference characters 1 to 16 are like as or equivalent to those employed in the first embodiment of the invention. In the thermal-type flow sensor according to the instant embodiment of the invention, the areas of the heat generating portions defined in the upstream heat generating resistor 4 and the downstream heat generating resistor 5 and the resistance values thereof, respectively, are identical to each other.

The average temperatures of the upstream and downstream heat generating resistors 4 and 5 are controlled by the control circuit shown in FIG. 5. In the thermal-type flow sensor according to the instant embodiment, however, the resistance values of the individual resistors constituting the bridge circuit are so determined that a mean temperature (i.e., temperature on an average) of the upstream heat generating resistor 4 is higher than that of the downstream heat generating resistor 5. In other words, the resistance values mentioned above are so selected that the temperature rise ΔT1 of the upstream heat generating resistor 4 is greater than the temperature rise ΔT2 of the downstream heat generating resistor 5 (i.e., ΔT1>ΔT2).

Figure 10:
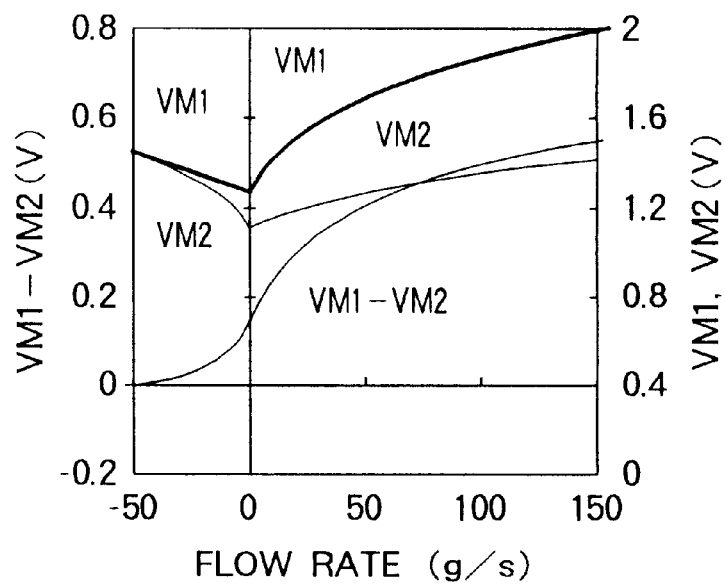
FIG. 10 is a view for graphically illustrating flow rate detection characteristics of a thermal-type flow sensor incorporating the flow rate detecting element according to the second embodiment of the invention.

With the arrangement described above, it applies valid that RH1=RH2, A1>A2, S1=S2 and that TH1>TH2 in the expressions (1) and (2). When the flow rate is zero, then Ta1≈Ta2. Thus, H1>H2, which in turn means that VM1−VM2>0. FIG. 10 is a view for graphically illustrating characteristic behaviors of the inter-terminal voltages VM1 and VM2 as well as that of the voltage difference (VM1−VM2) as a function of the flow rate in the thermal-type flow sensor according to the instant embodiment of the invention.

As can be seen from these figures, the difference between the inter-terminal voltages VM1 and VM2 (i.e., VM1−VM2) assumes a value of plus sign and increases monotonously within the range of the flow rate exceeding ca. −40 g/s inclusive. Consequently, the system which is designed to receive the output signal of the thermal-type flow sensor according to the instant embodiment for further processing or utilization thereof need not incorporate an interface circuit for processing the input values of minus or negative sign. Besides, there arises no necessity of providing additionally a bias voltage adder circuit internally of the thermal-type flow sensor itself.

The voltage difference (VM1−MV2) is amplified with a predetermined amplification factor by the amplifier circuit shown in FIG. 5 so that the output Vo of the thermal-type flow sensor assumes a value of zero to 5 volts within a range of the flow rates to be measured.

In the thermal-type flow sensor according to the instant embodiment of the invention, the quantity of heat transferred from the upstream heat generating portion to the downstream heat generating portion through the medium of the flowing fluid increases when it flows in the forward direction, whereby increasing of the heating current IH2 flowing through the downstream heat generating resistor 5 can be suppressed even when the flow rate increases. This means that the value Ta2 appearing in the expression (2) can be increased. Owing to this feature, difference between the heating currents flowing through the upstream heat generating resistor 4 and the downstream heat generating resistor 5, respectively, can be made large, whereby the sensitivity of the thermal-type flow sensor can be enhanced for the measurement of the flow rate for the fluid flowing in the forward direction.

Embodiment 4

Figure 4A:
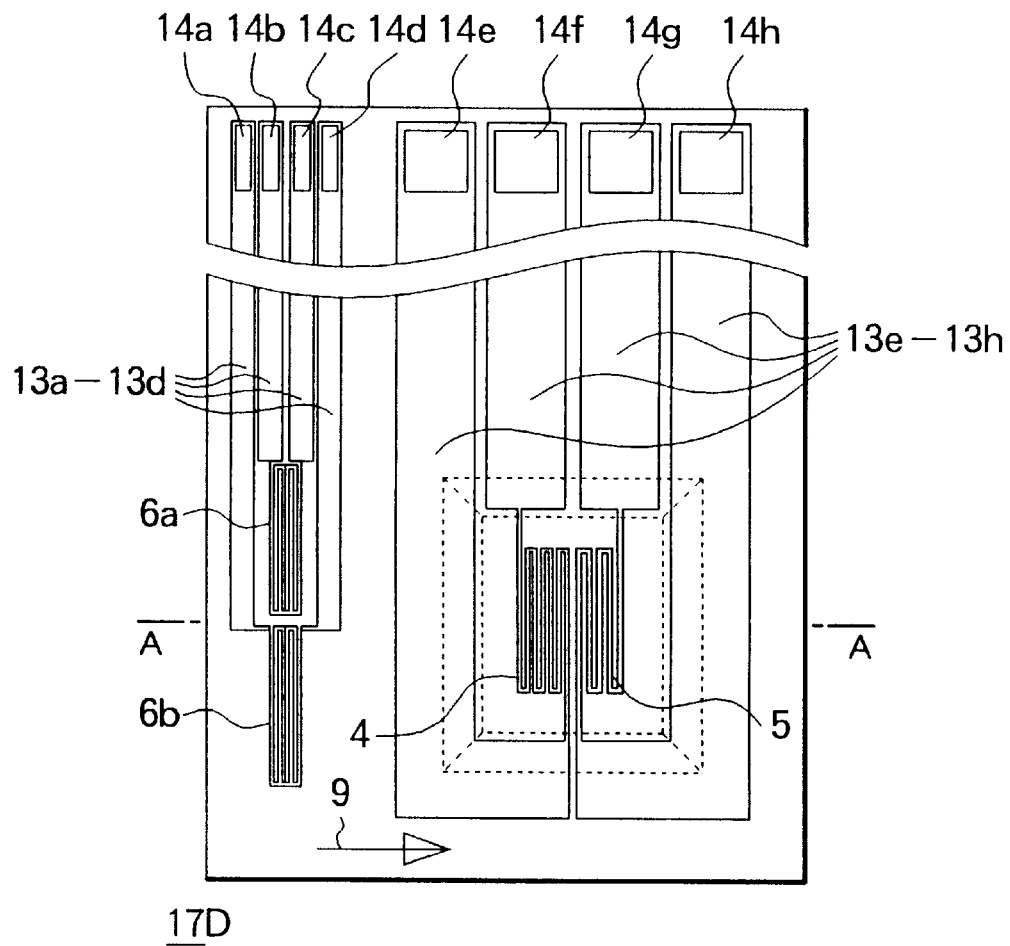
FIG. 4A is a plan view showing a flow rate detecting element according to a fourth embodiment of the present invention.
Figure 4B:
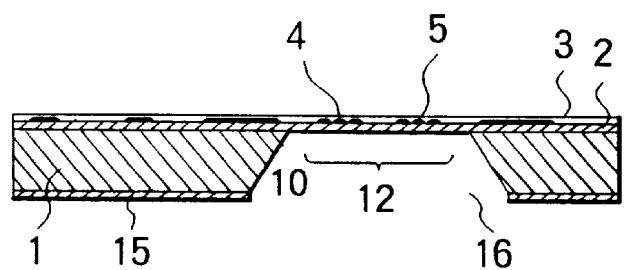
FIG. 4B is a sectional view of the same taken along a line A—A shown in FIG. 4A.

FIG. 4A is a plan view showing a flow rate detecting element 17D according to a fourth embodiment of the present invention, and FIG. 4B is a sectional view of the same taken along a line A—A shown in FIG. 4A. In the figures, components indicated by reference characters 1 to 16 are like as or equivalent to those employed in the first embodiment of the invention. In the thermal-type flow sensor according to the instant embodiment of the invention, the area S1 of the heat generating portion defined in the upstream heat generating resistor 4 is designed to be greater than the area S2 of the heat generating portion defined in the downstream heat generating resistor 5.

The upstream and downstream heat generating resistors 4 and 5 are so controlled as to be set at essentially same mean temperature by the control circuit shown in FIG. 5. With such arrangement, it applies valid that RH1=RH2, A1>A2, S1>S2 and that TH1>TH2 in the expressions (1) and (2). When the flow rate is zero, then Ta1≈Ta2. Thus, H1>H2, which in turn means that VM1−VM2>0.

Figure 11:
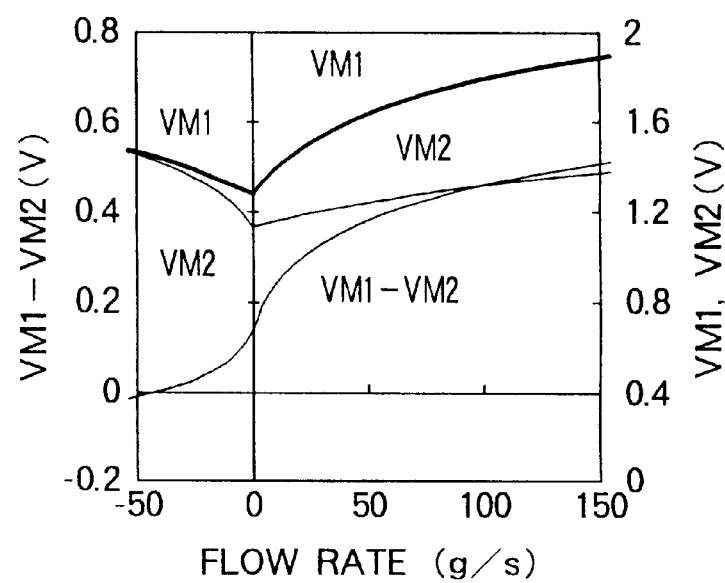
FIG. 11 is a view for graphically illustrating flow rate detection characteristics of a thermal-type flow sensor incorporating the flow rate detecting element according to the third embodiment of the invention.

FIG. 11 is a view for graphically illustrating characteristic behaviors of the inter-terminal voltages VM1 and VM2 as well as that of the voltage difference (VM1−VM2) as a function of the flow rate in the thermal-type flow sensor according to the instant embodiment of the invention. As can be seen from these figures, the difference between the inter-terminal voltages VM1 and VM2 (i.e., VM1−VM2) assumes a value of plus sign and increases monotonously within the range of the flow rate beyond ca. −40 g/s inclusive. Consequently, the system which is designed to receive the output signal of the thermal-type flow sensor according to the instant embodiment for further processing or utilization thereof need not incorporate an interface circuit for processing the input values of minus or negative sign. Besides, there arises no necessity of providing additionally a bias voltage adder circuit internally of the thermal-type flow sensor itself.

The voltage difference (VM1−MV2) is amplified with a predetermined amplification factor by the amplifier circuit shown in FIG. 5 so that the output Vo of the thermal-type flow sensor assumes a value of zero to 5 volts within a range of the flow rates to be measured.

In the thermal-type flow sensor according to the instant embodiment of the invention, the quantity of heat transferred from the upstream heat generating portion to the downstream heat generating portion through the medium of the flowing fluid increases when it flows in the forward direction, whereby increasing of the heating current IH2flowing through the downstream heat generating resistor 5 can be suppressed even when the flow rate increases. This means that the value Ta2 appearing in the expression (2) can be increased. Owing to this feature, difference between the heating currents flowing through the upstream heat generating resistor 4 and the downstream heat generating resistor 5, respectively, can be made large, whereby the sensitivity of the thermal-type flow sensor can be enhanced for the measurement of the flow rate for the fluid flowing in the forward direction.

In the thermal-type flow sensor according to the instant embodiment of the invention, the width of the upstream heat generating portion is increased in the flow direction in order that the upstream heat generating portion has a greater area than the downstream heat generating portion. However, the above-mentioned width may be increased in the direction orthogonal to the flowing direction.

Embodiment 5

In the thermal-type flow sensor according to a fifth embodiment of the present invention, the flow-rate detecting element 17C shown in FIG. 3 is employed, wherein the resistance values RM1 and RM2 of the reference resistors 24a and 24b serving for detection of heating currents, as described hereinbefore by reference to FIG. 5, are so selected that RM1>RM2 while the resistance values of fixed resistors 27a and 27b, 28a and 28b of the bridge circuits 23a and 23b are so selected that the condition TH1=TH2 is satisfied.

Figure 12:
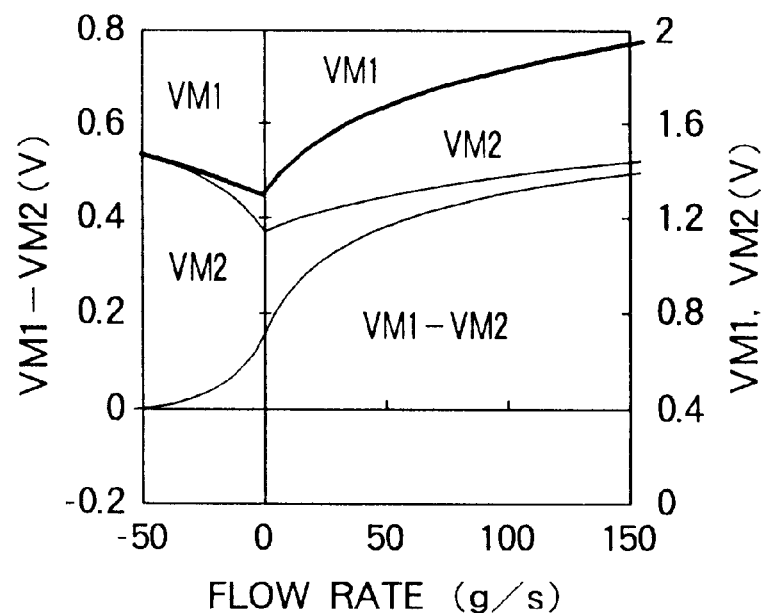
FIG. 12 is a view for graphically illustrating flow rate detection characteristics of a thermal-type flow sensor incorporating the flow rate detecting element according to the fourth embodiment of the invention.
Figure 13:
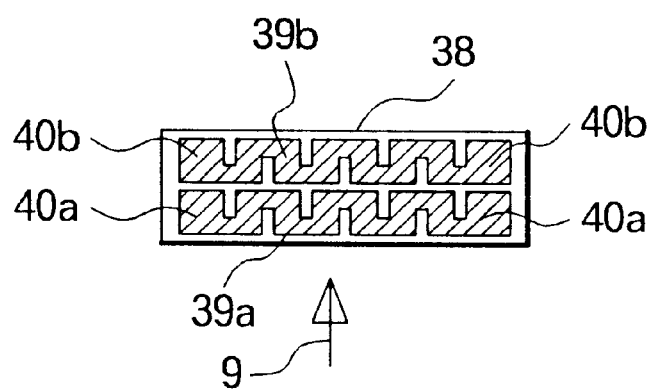
FIG. 13 is a view showing a flow rate detecting element employed in a thermal-type flow sensor known heretofore.
Figure 14:
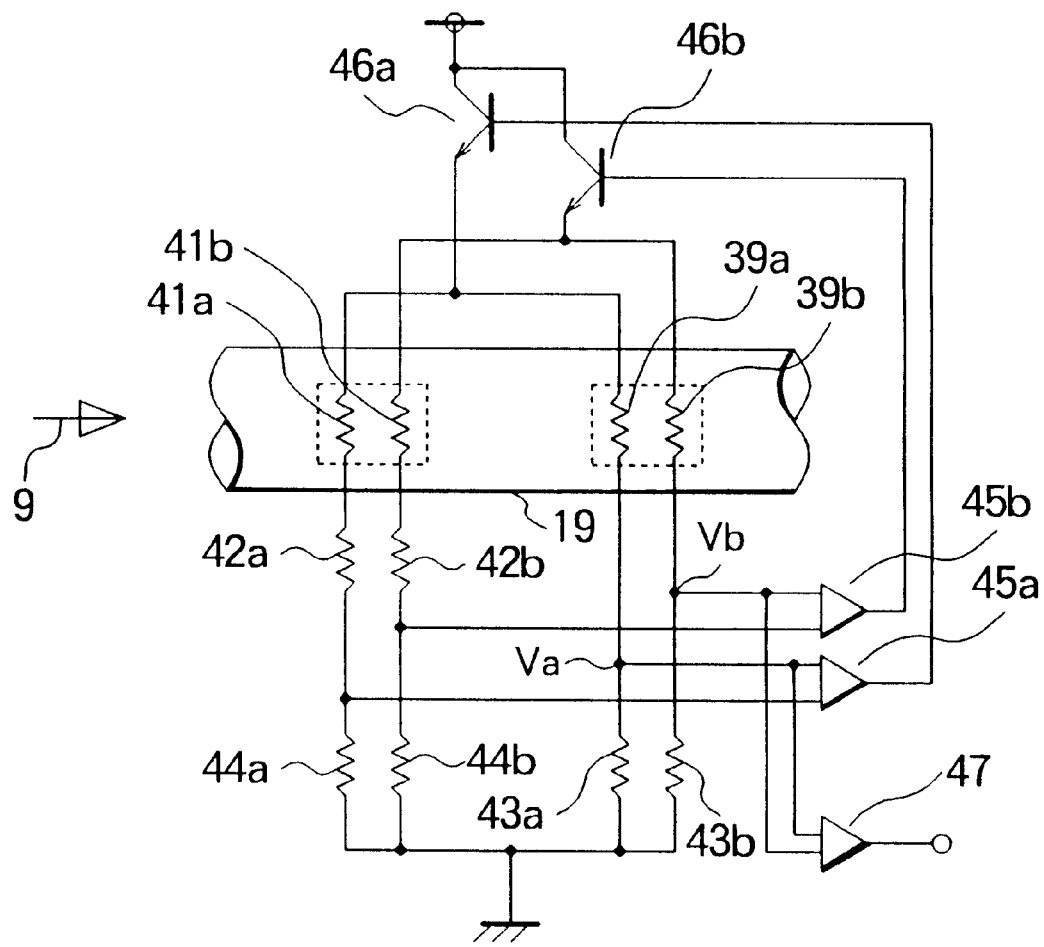
FIG. 14 is a circuit diagram showing a circuit configuration of a thermal-type flow sensor known heretofore.

In this case, from the expressions (1) and (2), H1=H2 when the flow rate is zero. Thus, VM1−VM2>0 from the expressions (3) and (4). FIG. 12 is a view for graphically illustrating characteristic behaviors of the inter-terminal voltages VM1 and VM2 as well as that of the voltage difference (VM1−VM2) as a function of the flow rate in the thermal-type flow sensor according to the instant embodiment of the invention.

As can be seen from the figure, the difference between the inter-terminal voltage VM1 and the inter-terminal voltage VM2 (i.e., VM1−VM2) assumes values of plus sign and increases monotonously within the range of the flow rate exceeding ca. −40 g/s. Consequently, the system which is designed to receive the output signal of the thermal-type flow sensor according to the instant embodiment for further processing or utilization thereof need not incorporate an interface circuit for processing the input values of minus or negative sign. Besides, there arises no necessity of providing additionally a bias voltage adder circuit internally of the thermal-type flow sensor itself. The voltage difference (VM1−MV2) is amplified with a predetermined amplification factor by the amplifier circuit shown in FIG. 5 so that the output Vo of the thermal-type flow sensor assumes a value of zero to 5 volts within a range of the flow rates to be measured.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the foregoing description, it has been assumed that the flow-rate detecting elements 17A to 17D are implemented in a plate-like or planar form. However, the invention is never restricted to any specific form. The flow rate detecting element may be implemented, for instance, in a single cylinder deposited with resistor films at upstream and downstream sides, respectively. Further, the flow rate detecting element may be constituted by an array of cylindrical elements deposited with platinum films or wound with platinum wires, respectively, disposed in juxtaposition in the flowing direction. Additionally, the heat generating portions of the upstream and downstream heat generating resistors 4 and 5 are not limited to the sizes described hereinbefore.

Accordingly, all suitable modifications and equivalents may be resorted to, falling within the spirit and scope of the invention.

What is claimed is:

1. A thermal-type flow sensor including a plurality of heat generating portions implemented by heat-sensitive resistors disposed at positions upstream and downstream within a passage as viewed in a direction in which fluid flows through said passage, to thereby measure a flow rate or a flowing speed of said fluid on the basis of heat transfer phenomenon taking place between said heat generating portions and said fluid, comprising:

heating current control means for controlling heating currents flowing through said heat-sensitive resistors so that temperatures of said plurality of heat generating portions increase by predetermined values relative to temperature of said fluid;

means for determining difference between heating currents flowing through the heat generating portion located upstream and the heat generating portion located downstream in said plurality of heat generating portions; and means for detecting the flowing speed or said flow rate of said fluid on the basis of the difference between said heating currents, wherein the heating current flowing through said heat-sensitive resistor located upstream is set to be greater than the heating current flowing through said heat-sensitive resistor located downstream when said flow rate is zero.

2. A thermal-type flow sensor according to claim 1, wherein said heat-sensitive resistors constituting said heat generating portions are so designed that a resistance value of said heat-sensitive resistor located upstream is smaller than a resistance value of said heat-sensitive resistor located downstream.

3. A thermal-type flow sensor according to claim 1, wherein each of said heat-sensitive resistors is implemented in the form of a film, and wherein said heat-sensitive resistor located upstream have a film thickness which is greater than that of said heat-sensitive resistor located downstream.

4. A thermal-type flow sensor according to claim 1, wherein a mean temperature of said heat-sensitive resistor located upstream is higher than that of said heat-sensitive resistor located downstream.

5. A thermal-type flow sensor according to claim 1, wherein said heat generating portion located upstream has an area greater than the area of said heat generating portion located downstream.

6. A thermal type flow sensor including a plurality of heat generating portions implemented by first and second heat-sensitive resistors disposed at positions upstream and downstream, respectively, within a passage as viewed in a direction in which fluid flows through said passage, to thereby measure a flow rate or a flowing speed of said fluid on the basis of a heat transfer phenomenon taking place between said heat generating portions and said fluid, said flow sensor comprising:

heating current control means for controlling the heating currents flowing through the heat-sensitive resistors so that the temperatures of said plurality of heat generating positions increase by predetermined values relative to the temperature of said fluid;

a first resistor, connected in series to said first heat-sensitive resistor, disposed upstream of said fluid for detecting the current flowing through said first heat-sensitive resistor;

a second resistor, having a lower resistance value than that of said first resistor and connected in series to said second heat-sensitive resistor, disposed downstream of said fluid for detecting the current flowing through the second heat-sensitive resistor; and means for detecting the flow rate or the flowing speed of said fluid based on a difference between a voltage across said first resistor and a voltage across said second resistor.

* * * * *